United States Patent
Matsutani

(10) Patent No.: US 7,739,428 B2
(45) Date of Patent: Jun. 15, 2010

(54) MEMORY CONTROL APPARATUS AND MEMORY CONTROL METHOD

(75) Inventor: Takashi Matsutani, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 695 days.

(21) Appl. No.: 11/610,719

(22) Filed: Dec. 14, 2006

(65) Prior Publication Data

US 2007/0171916 A1    Jul. 26, 2007

(30) Foreign Application Priority Data

Jan. 24, 2006  (JP)  ............................. 2006-014737

(51) Int. Cl.
*G06F 3/00* (2006.01)
*G06F 15/00* (2006.01)

(52) U.S. Cl. ........................................ 710/57; 345/501

(58) Field of Classification Search .................. 710/22, 710/57; 345/501

See application file for complete search history.

(56) References Cited

U.S. PATENT DOCUMENTS

| 5,241,661 A * | 8/1993 | Concilio et al. ................ 710/40 |
| 5,793,384 A * | 8/1998 | Okitsu ......................... 345/535 |
| 2003/0189934 A1* | 10/2003 | Jeffries et al. ............ 370/395.4 |

* cited by examiner

*Primary Examiner*—Henry W. H. Tsai
*Assistant Examiner*—Hyun Nam
(74) *Attorney, Agent, or Firm*—Oblon, Spivak, McClelland, Maier & Neustadt, L.L.P.

(57) ABSTRACT

For an electronic apparatus in which data is transferred between a plurality of processing devices and a memory, a technique is provided which prevents the data transfer from being restricted and allows the processing devices to operate efficiently. The order of priorities of data transfer operations through channels is changed on the basis of a relation between thresholds and the amounts of data remaining respectively in FIFO buffers. This prevents the FIFO buffers from becoming empty of data, or from being filled up with data, which allows the devices to operate efficiently.

14 Claims, 3 Drawing Sheets

MEMORY CONTROL APPARATUS AND MEMORY CONTROL METHOD

BACKGROUND OF THE INVENTION

1. Field of the Invention

The present invention relates to a technique for transferring data between a plurality of devices and memory in an electronic apparatus.

2. Description of the Background Art

Electronic apparatuses, such as digital still cameras, are equipped with a plurality of processing units (devices) that apply various processes to image data and the like. The operation of such an electronic apparatus proceeds as these devices process data while sequentially transferring the data between memory and themselves.

In such an electronic apparatus, each device is equipped with a buffer or buffers for temporarily storing the data transferred between the devices and memory. When data is transferred between a device and the memory, the data is once accumulated in a buffer of the device, and the accumulated data is sequentially sent to the destination. Data is thus transferred in succession without a break.

However, in conventional electronic apparatuses, the devices are previously assigned an order of priorities of data transfer. When some devices present requests for data transfer at the same time, the devices are allowed to transfer data according to the order of priorities.

Accordingly, in such conventional electronic apparatuses, devices having lower priorities are less likely to be allowed to transfer data, while devices having higher priorities can always preferentially transfer data. Therefore, the buffers in the lower-priority devices may become completely empty of data or filled up with data, which may force the devices to stop their operations.

SUMMARY OF THE INVENTION

The present invention is directed to a memory control apparatus that controls data transfer between a plurality of devices and a memory.

According to the invention, a memory control apparatus includes: a parameter-recognizable portion having a parameter whose values are externally recognizable, where the parameter serves as a basis for determining an order of priorities indicating which of the plurality of devices should be given a right to perform the data transfer; and a priority order setting portion that sets the order of priorities on the basis of the values of the parameter.

It is thus possible to prevent the data transfer from being restricted and allow the devices to operate efficiently.

Preferably, the parameter-recognizable portion includes a plurality of buffers that are assigned to the plurality of devices, and the parameter is information about the amounts of data remaining respectively in the plurality of buffers.

It is thus possible to prevent the buffers from becoming empty of data, or from being filled up with data, and so the devices can operate efficiently.

Preferably, when receiving a first urgency notice signal that is sent when the amount of data remaining in some one of the buffers is above a predetermined threshold, the priority order setting portion raises the priority of the data transfer performed by the device that is sending the first urgency notice signal.

Thus, for operations of writing data from the devices to the memory, it is possible to prevent the buffers from being filled up with data, and so the devices can operate efficiently.

Preferably, when receiving a second urgency notice signal that is sent when the amount of data remaining in some one of the buffers is below a predetermined threshold, the priority order setting portion raises the priority of the data transfer performed by the device that is sending the second urgency notice signal.

Thus, for operations of reading data from the memory to the devices, it is possible to prevent the buffers from becoming empty of data, and so the devices can operate efficiently.

Preferably, the memory control apparatus further includes a threshold setting portion that sets a threshold of the parameter individually for each of the plurality of buffers.

It is thus possible to arbitrarily set the timings to change the priorities according to the data consuming rates of the individual devices.

Preferably, the data transfer is performed according to Direct Memory Access.

It is thus possible to perform the data transfer without imposing a burden on the CPU.

Preferably, the priorities are assigned as default values respectively to the plurality of buffers independently of the parameter, and the priority order setting portion changes the priorities from the default values on the basis of the values of the parameter.

When the parameter indicates no difference among the plurality of devices, the data transfer operations can be sequentially performed according to the default values. Also, the order of priorities can be changed on the basis of the parameter.

Preferably, the plurality of devices are devices that process image data in a digital still camera, and a highest one of the priorities is assigned as the default value to one of the plurality of devices that operates to accept the image data from outside.

It is thus possible to prevent lack of the image data inputted from outside.

The present invention is directed also to a memory control method for controlling data transfer between a plurality of devices and a memory.

Thus, an object of the present invention is to provide a technique for preventing data transfer from being restricted and allowing devices to operate efficiently, in an electronic apparatus in which data is transferred between a plurality of devices and a memory.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
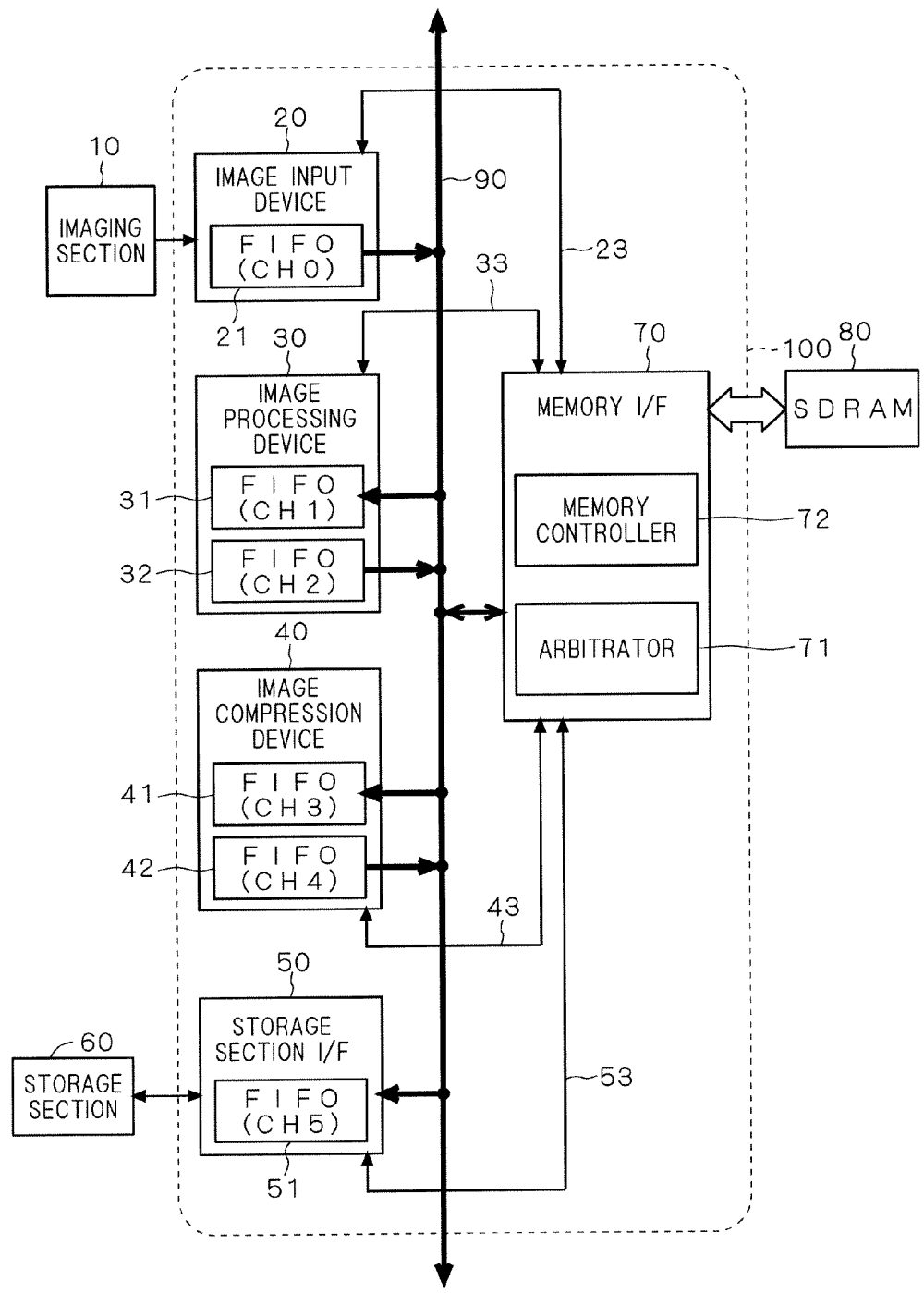
FIG. 1 is a block diagram illustrating the configuration of a digital still camera.

A preferred embodiment of the present invention will now be described referring to the drawings.

FIG. 1 is a block diagram illustrating the configuration of a digital still camera 1 that is equipped with a memory control apparatus of the present invention. The digital still camera 1 is an electronic apparatus that obtains image data, and it mainly includes an imaging section 10, an image input device 20, an image processing device 30, an image compression device 40, a storage section interface 50, a storage section 60, a memory interface 70, and an SDRAM 80. The image input device 20, the image processing device 30, the image compression device 40, and the storage section interface 50 are connected with the memory interface 70 through a data bus 90.

The imaging section 10 is a sensor that captures optical information from the object by converting the optical information to an electric signal. The imaging section 10 is formed of an imaging element such as a CCD or CMOS element, for example. The image input device 20 is a processing device that operates to capture the electric signal obtained by the imaging section 10 into the apparatus as digital data. The data inputted through the image input device 20 is transferred to the SDRAM 80 through the data bus 90 and the memory interface 70, and stored in the SDRAM 80. The data stored in the SDRAM 80 is then transferred to the image processing device 30 through the memory interface 70 and the data bus 90 again.

The image processing device 30 is a processing device that applies image processings, such as interpolation, to data transferred from the SDRAM 80. The image processing device 30 image-processes the data by generating three colors of R, G, B for each single pixel, from data of each-pixel one-color. The data image-processed in the image processing device 30 is transferred to the SDRAM 80 through the data bus 90 and the memory interface 70, and stored in the SDRAM 80. The data stored in the SDRAM 80 is then transferred to the image compression device 40 through the memory interface 70 and the data bus 90 again.

The image compression device 40 is a processing device that compresses data transferred from the SDRAM 80. The image compression device 40 compresses data according to a given image format, such as JPEG. The compressed data is then transferred to the SDRAM 80 through the data bus 90 and the memory interface 70, and stored in the SDRAM 80. The data stored in the SDRAM 80 is then transferred to the storage section interface 50 through the memory interface 70 and the data bus 90 again.

The storage section interface 50 is a processing device that mediates data transfer to the storage section 60. The storage section interface 50 adapts the data received from the SDRAM 80 according to a predetermined standard and transfers the adapted data to the storage section 60. The storage section 60 stores the data received through the storage section interface 50 into a given storage medium.

In this way, the digital still camera 1 proceeds with its imaging operation as the plurality of devices 20, 30, 40, 50 process data while transferring data between the SDRAM 80 and themselves through the data bus 90.

The digital still camera 1 includes FIFO buffers 21, 31, 32, 41, 42 and 51 for temporarily storing the transferred data. The FIFO buffer 21 is assigned to the image input device 20, the FIFO buffers 31 and 32 are assigned to the image processing device 30, the FIFO buffers 41 and 42 are assigned to the image compression device 40, and the FIFO buffer 51 is assigned to the storage section interface 50. When the image input device 20, the image processing device 30, the image compression device 40, and the storage section interface 50 transfer data to/from the SDRAM 80, the transferred data is once accumulated in the FIFO buffer 21, 31, 32, 41, 42 or 51, and the data accumulated in the FIFO buffer 21, 31, 32, 41, 42 or 51 is then sequentially sent to the destination. The data is thus continuously transferred without a break.

The FIFO buffers 21, 32 and 42 are buffers for temporarily storing data when the respective devices write data to the SDRAM 80. Accordingly, the FIFO buffers 21, 32 and 42 are hereinafter referred to as "write FIFO buffers". On the other hand, the FIFO buffers 31, 41 and 51 are buffers for temporarily storing data when the respective devices read data from the SDRAM 80. Accordingly, the FIFO buffers 31, 41 and 51 are hereinafter referred to as "read FIFO buffers".

The data transfer operations between the SDRAM 80 and the image input device 20, the image processing device 30, the image compression device 40, and the storage section interface 50 are performed by DMA (Direct Memory Access) without through the CPU. This apparatus is capable of performing DMA transfer using a plurality of channels CH0 to CH5, and the FIFO buffers 21, 31, 32, 41, 42 and 51 are utilized for the DMA transfer operations respectively through the CH0, CH1, CH2, CH3, CH4 and CH5.

The image input device 20, the image processing device 30, the image compression device 40, and the storage section interface 50 are connected to the memory interface 70 respectively through control lines 23, 33, 43 and 53. The image input device 20, the image processing device 30, the image compression device 40, and the storage section interface 50 send data transfer request signals and urgency notice signals to the memory interface 70 through the control lines 23, 33, 43 and 53.

The memory interface 70 includes an arbitrator 71 that determines the order of priorities according to which the channels are allowed to transfer data, on the basis of the transfer request signals received from the individual channels, and a memory controller 72 that controls data write and read operations to and from the SDRAM 80. When receiving data transfer request signals from some channels, the memory interface 70 assigns priorities among the channels on the basis of the transfer request signals, and allows one of the channels (i.e., one of the FIFO buffers) to perform data transfer with the SDRAM 80.

Figure 2:
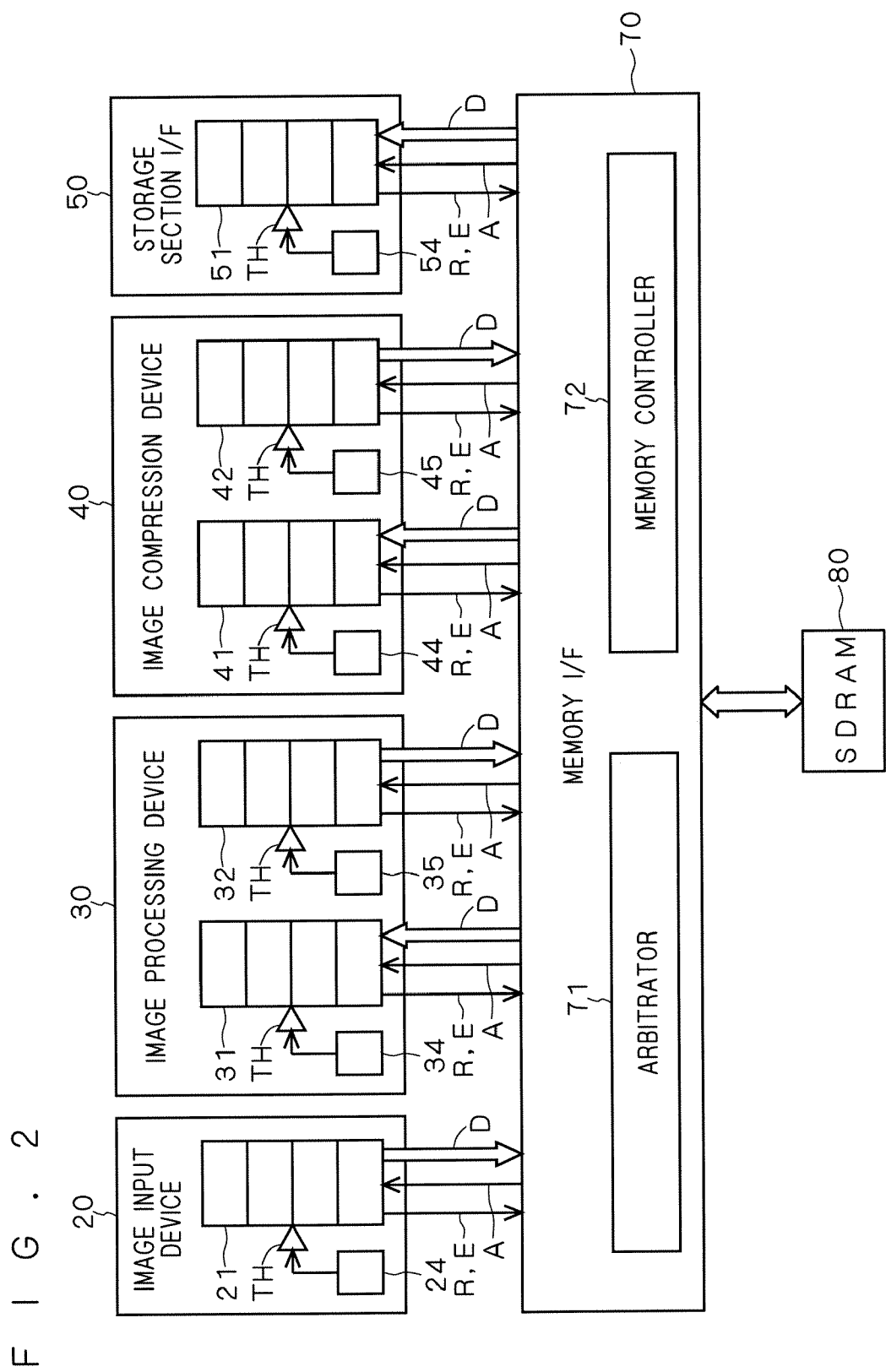
FIG. 2 is a block diagram schematically illustrating the data transfer.

FIG. 2 is a block diagram schematically showing the data transfer between the SDRAM 80 and the image input device 20, the image processing device 30, the image compression device 40, and the storage section interface 50. Each of the FIFO buffers 21, 31, 32, 41, 42 and 51 of the devices includes four blocks as regions for storing data. The image input device 20, the image processing device 30, and the image compression device 40 send a data transfer request signal R (a signal for requesting transfer of data D from the device to the SDRAM 80) to the memory interface 70 when one block or more of data is accumulated in the write FIFO buffer 21, 32, or 42. On the other hand, the image processing device 30, the image compression device 40, and the storage section interface 50 send a data transfer request signal R (a signal for requesting transfer of data D from the SDRAM 80 to the device) to the memory interface 70 when there is one block or more of empty area in the read FIFO buffer 31, 41 or 51.

A threshold TH is set for each of the FIFO buffers 21, 31, 32, 41, 42 and 51 of the individual channels. The image input device 20, the image processing device 30, the image compression device 40, and the storage section interface 50 send urgency notice signals E to the memory interface 70 on the basis of a relation between the respective thresholds TH and the amounts of data remaining respectively in the FIFO buffers 21, 31, 32, 41, 42 and 51. For example, an urgency notice signal E is sent to the memory interface 70 when the amount of data remaining in the write FIFO buffer 21, 32 or 42 is above the corresponding threshold TH. Also, the urgency notice signal E is sent to the memory interface 70 when the amount of data remaining in the read FIFO buffer 31, 41 or 51 is below the corresponding threshold TH.

The arbitrator 71 in the memory interface 70 changes the order of data-transfer priorities of the channels on the basis of the data transfer request signals R and urgency notice signals E received from the channels. Then, the memory controller 72 in the memory interface 70 sends an accept signal A to the channel having the highest priority, and controls the transfer of data D between the FIFO buffer of that channel and the SDRAM 80.

Figure 3:
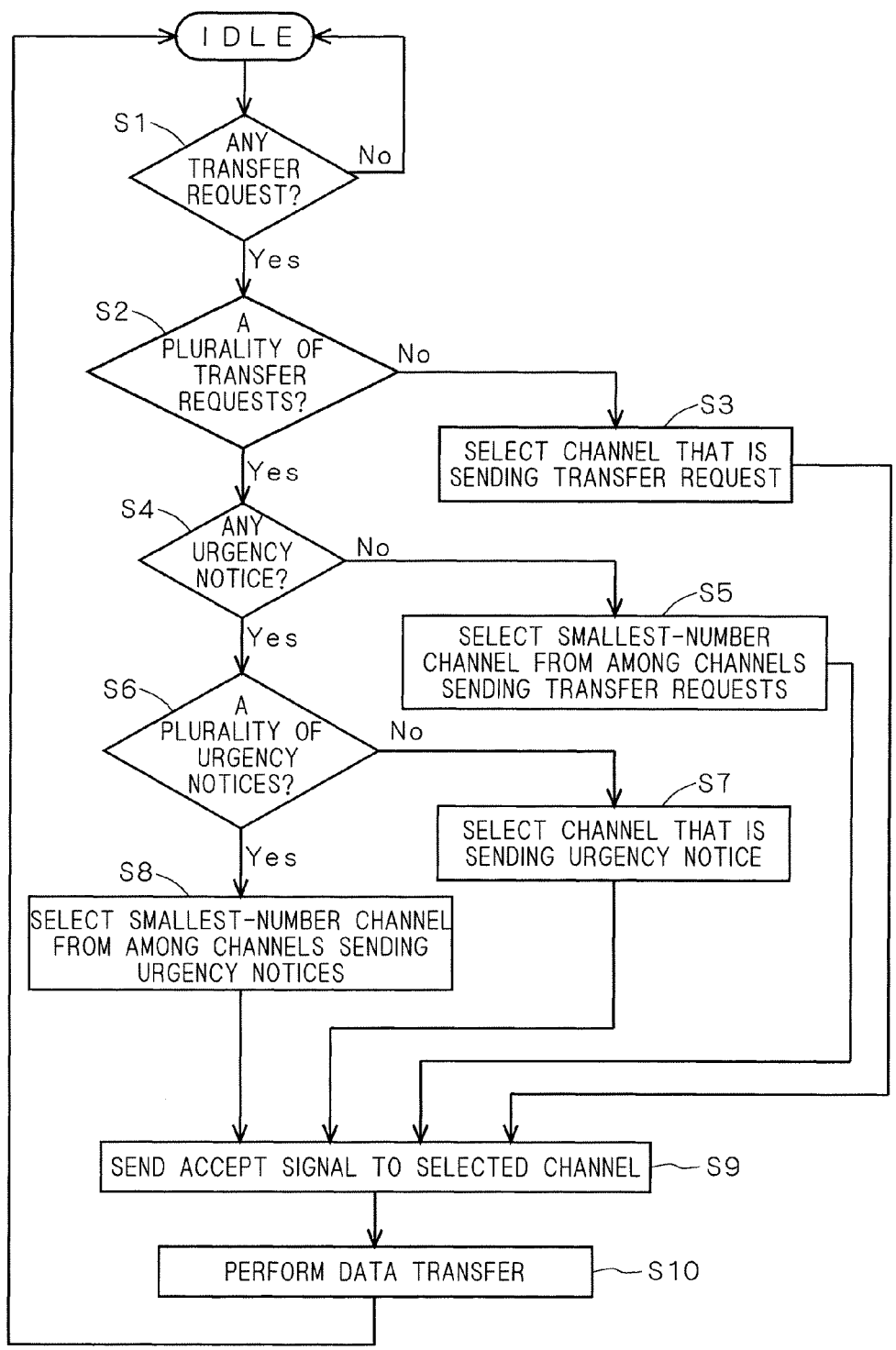
FIG. 3 is a flowchart showing a procedure of operations performed by the memory interface.

FIG. 3 is a flowchart showing a procedure according to which the arbitrator 71 changes the order of priorities and the memory controller 72 controls the data transfers. First, the arbitrator 71 monitors whether there are any transfer request signals from channels (step S1). When there is no transfer request signal, the arbitrator 71 waits while repeatedly monitoring the presence/absence of transfer request signal. On the other hand, when any transfer request signal is received, the arbitrator 71 then checks whether one channel is sending a transfer request signal or a plurality of channels are sending transfer request signals (step S2). When a single channel is sending a transfer request signal, the arbitrator 71 selects that channel as the highest-priority channel (step S3).

On the other hand, when a plurality of channels are sending transfer request signals, the arbitrator 71 then checks whether any of those channels is sending an urgency notice signal (step S4). Then, when no channel is sending an urgency notice signal, the arbitrator 71 selects the channel having the smallest number as the highest-priority channel, from among the channels sending the transfer request signals (step S5).

On the other hand, when any of the channels is sending an urgency notice signal, the arbitrator 71 then checks whether a single channel is sending an urgency notice signal or a plurality of channels are sending urgency notice signals (step S6). Then, when a single channel is sending an urgency notice signal, the arbitrator 71 selects that channel as the highest-priority channel (step S7). When a plurality of channels are sending urgency notice signals, the arbitrator 71 selects the channel having the smallest number as the highest-priority channel, from among the channels sending the urgency notice signals (step S8).

Next, the arbitrator 71 sends an accept signal A to the channel selected as the highest-priority channel (step S9). Subsequently, the memory controller 72 executes the transfer of data D between the SDRAM 80 and the channel to which the accept signal A has been sent (step S10).

In this way, in this apparatus, the FIFO buffers 21, 31, 32, 41, 42 and 51 and the memory interface 70 form a memory control section 100 (see FIG. 1) that controls transfers of data D between the plurality of devices 20, 30, 40 and 50 and the SDRAM 80. The memory control section 100 changes the order of priorities of data transfer operations through the channels on the basis of the relation between the thresholds TH and the amounts of data remaining in the FIFO buffers 21, 31, 32, 41, 42 and 51. This prevents the FIFO buffers 21, 31, 32, 41, 42 and 51 from becoming empty of data or from being filled up with data, which allows the devices 20, 30, 40 and 50 to operate efficiently.

Also, as shown in FIG. 2, the individual thresholds TH for the respective FIFO buffers 21, 31, 32, 41, 42 and 51 can be changed by adjusting registers 24, 34, 35, 44, 45 and 54 provided in the devices. This makes it possible to arbitrarily change the timings of generation of the urgency notice signals E according to the data consuming rates of the devices. For example, for the write FIFO buffers 21, 32 and 42, the threshold for a device having a higher data consuming rate (data rate) may be set lower so that the urgency notice signal is generated in an earlier stage, and the threshold for a device having a lower data consuming rate may be set higher so that the data can be transferred collectively and efficiently. Also, for the read FIFO buffers 31, 41 and 51, the threshold for a device having a higher data consuming rate may be set higher so that the urgency notice signal is generated in an earlier stage, and the threshold for a device having a lower data consuming rate may be set lower so that the data can be transferred collectively and efficiently.

Also, as mentioned above, in this digital still camera 1, a higher priority is given to a data transfer operation performed by a channel with a smaller number, among channels not sending urgency notice signals E or among channels sending urgency notice signals E. That is, in this digital still camera 1, the individual channels are assigned their respective data transfer priorities as default values. Then, in this digital still camera 1, the data transfer from the image input device 20 to the SDRAM 80 uses the channel CH0 having the smallest number. Accordingly, the data transfer from the image input device 20 to the SDRAM 80 is given relatively high priority, which prevents lack of input image data.

While an embodiment of the present invention has been described, the present invention is not restricted by the example shown above. In this example, the priorities of data transfer operations through the channels are changed on the basis of the amounts of data remaining in the FIFO buffers 21, 31, 32, 41, 42 and 51. However, the data transfer priorities of the channels may be changed according to other parameter.

For example, the data-transfer priorities of the channels may be changed on the basis of the states of pre-charge of banks included in the SDRAM. That is, because the data transfer operation of a bank that is being pre-charged is restricted, the order of priorities may be changed in such a way that the priority of a channel having a request for access to a bank being pre-charged is lowered and the priority of a channel having a request for access to a bank not being pre-charged is raised. In general, means having a parameter whose values are recognizable form outside, such as FIFO buffers or banks, is provided, and the parameter functions as a basis for the determination of the order of priorities that indicates which of a plurality of devices is to be given the right to perform a data transfer operation, and the order of data-transfer priorities is settled among a plurality of channels on the basis of the values of the parameter. This avoids restrictions of data transfer and allows the devices to operate efficiently.

Also, the applications of the present invention are not limited to digital still cameras. The present invention is generally applicable to any electronic apparatuses that process data while sequentially transferring data between a plurality of devices and memory.

While the invention has been described in detail, the foregoing description is in all aspects illustrative and not restrictive. It is understood that numerous other modifications and variations can be devised without departing from the scope of the invention.

What is claimed is:

1. A memory control apparatus that controls data transfer between a plurality of devices and a memory, comprising:
   a parameter-recognizable portion having a parameter whose values are externally recognizable, said parameter serving as a basis for determining an order of priorities indicating which of said plurality of devices should be given a right to perform said data transfer; and
   a priority order setting portion that sets said order of priorities on the basis of the values of said parameter, wherein
   said parameter-recognizable portion includes a plurality of buffers that are assigned to said plurality of devices,
   said parameter is information about the amounts of data remaining respectively in said plurality of buffers, and
   said priority order setting portion receives a data transfer request signal from said plurality of devices, and on the basis of an urgency notice signal that is sent separately from said data transfer request signal based on the amounts of data remaining respectively in said plurality of buffers, said priority order setting portion sets an order of priorities of a data transfer performed by the device that is sending said urgency notice signal.

2. The memory control apparatus according to claim 1, wherein, when receiving a first urgency notice signal that is sent when said amount of data remaining in some one of said buffers is above a predetermined threshold, said priority order setting portion raises the priority of the data transfer performed by a device that is sending the first urgency notice signal.

3. The memory control apparatus according to claim 1, wherein, when receiving a second urgency notice signal that is sent when said amount of data remaining in some one of said buffers is below a predetermined threshold, said priority order setting portion raises the priority of the data transfer performed by a device that is sending the second urgency notice signal.

4. The memory control apparatus according to claim 1, further comprising a threshold setting portion that sets a threshold of said parameter individually for each of said plurality of buffers.

5. The memory control apparatus according to claim 4, wherein said data transfer is performed according to Direct Memory Access.

6. The memory control apparatus according to claim 5, wherein said priorities are assigned as default values respectively to said plurality of buffers independently of said parameter, and
said priority order setting portion changes said priorities from said default values on the basis of the values of said parameter.

7. The memory control apparatus according to claim 6, wherein said plurality of devices are devices that process image data in a digital still camera, and
a highest one of said priorities is assigned as the default value to one of said plurality of devices that operates to accept the image data from outside.

8. A memory control method for controlling data transfer between a plurality of devices and a memory, comprising the steps of:
(a) recognizing values of a parameter that serves as a basis for determining an order of priorities indicating which of said plurality of devices should be given a right to perform said data transfer; and
(b) setting said order of priorities on the basis of the values of said parameter, wherein
said parameter is information about the amounts of data remaining respectively in a plurality of buffers assigned to said plurality of devices, and
in said step (b), a data transfer request signal is received from said plurality of devices, and on the basis of an urgency notice signal that is sent separately from said data transfer request signal based on the amounts of data remaining respectively in said plurality of buffers, an order of priorities of a data transfer performed by the device that is sending said urgency notice signal is set.

9. The memory control method according to claim 8, wherein, in said step (b), upon reception of a first urgency notice signal that is sent when said amount of data remaining in some one of said buffers is above a predetermined threshold, the priority of the data transfer performed by the device that is sending the first urgency notice signal is raised.

10. The memory control method according to claim 8, wherein, in said step (b), upon reception of a second urgency notice signal that is sent when said amount of data remaining in some one of said buffers is below a predetermined threshold, the priority of the data transfer performed by the device that is sending the second urgency notice signal is raised.

11. The memory control method according to claim 8, further comprising the step (c) of setting a threshold of said parameter individually for each of said plurality of buffers.

12. The memory control method according to claim 11, wherein said data transfer is performed according to Direct Memory Access.

13. The memory control method according to claim 12, wherein said priorities are assigned as default values respectively to said plurality of buffers independently of said parameter, and
in said step (b), said priorities are changed from said default values on the basis of the values of said parameter.

14. The memory control method according to claim 13, wherein said plurality of devices are devices that process image data in a digital still camera, and a highest one of said priorities is assigned as the default value to one of said plurality of devices that operates to accept the image data from outside.

* * * * *